United States Patent
Yap

(10) Patent No.: US 7,108,489 B2
(45) Date of Patent: Sep. 19, 2006

(54) TERMINAL BLOCK ASSEMBLY FOR A HERMETIC COMPRESSOR

(75) Inventor: Zer Kai Yap, Tecumseh, MI (US)

(73) Assignee: Tecumseh Products Company, Tecumseh, MI (US)

( * ) Notice: Subject to any disclaimer, the term of this patent is extended or adjusted under 35 U.S.C. 154(b) by 384 days.

(21) Appl. No.: 10/414,332

(22) Filed: Apr. 15, 2003

(65) Prior Publication Data

US 2004/0208762 A1 Oct. 21, 2004

(51) Int. Cl.
 *F04B 17/00* (2006.01)
(52) U.S. Cl. ............... 417/410.1; 417/572; 417/902
(58) Field of Classification Search ........... 417/572, 417/902, 410.1
 See application file for complete search history.

(56) References Cited

U.S. PATENT DOCUMENTS

| | | | | |
|---|---|---|---|---|
| 3,998,515 | A | 12/1976 | Panek | 339/117 P |
| 4,096,352 | A | 6/1978 | von Zweck | 174/153 R |
| 4,445,744 | A | 5/1984 | Sedig et al. | 339/94 M |
| 4,519,662 | A | 5/1985 | Riley et al. | 339/94 R |
| 4,961,018 | A | 10/1990 | Akhter | 310/87 |
| 5,145,417 | A | 9/1992 | Honkomp et al. | 439/685 |
| 5,227,587 | A * | 7/1993 | Paterek | 174/152 GM |
| 5,328,340 | A * | 7/1994 | Hara et al. | 418/55.1 |
| 5,460,549 | A | 10/1995 | Muzslay | 439/733.1 |
| 5,584,716 | A * | 12/1996 | Bergman | 439/282 |
| 5,639,255 | A | 6/1997 | Muzslay | 439/347 |
| 5,727,421 | A | 3/1998 | Murphy | 73/304 R |
| 6,107,566 | A | 8/2000 | Quadir et al. | 174/50.52 |
| 6,114,633 | A * | 9/2000 | Duhancik | 174/152 GM |
| 6,156,978 | A | 12/2000 | Peck et al. | 174/151 |
| 6,164,934 | A * | 12/2000 | Niihara et al. | 417/423.14 |
| 6,300,698 | B1 | 10/2001 | Fargo et al. | 310/71 |
| 6,362,424 | B1 | 3/2002 | Honkomp et al. | 174/50.52 |
| 6,372,993 | B1 * | 4/2002 | Eckels et al. | 174/152 GM |
| 6,439,899 | B1 | 8/2002 | Muzslay et al. | 439/98 |
| 2002/0155741 | A1 | 10/2002 | Herrick et al. | 439/199 |

* cited by examiner

*Primary Examiner*—Tae Jun Kim
*Assistant Examiner*—Ryan P. Gillan
(74) *Attorney, Agent, or Firm*—Baker & Daniels

(57) ABSTRACT

A terminal assembly for a hermetic compressor including a metallic disk having an interior side, an opposite exterior side, and a plurality of holes extending therethrough, the interior side of the metallic disk defining a first diameter sized to fit within an aperture of a compressor housing, the metallic disk defining a second diameter adjacent the first diameter and sized larger than the first diameter; and a plurality of terminal pin assemblies, each one of the terminal pin assemblies received in a corresponding one of the plurality of holes. Each of the terminal pin assemblies include an elongate conductive pin; and an annular collar disposed about the conductive pin and having a threaded outer surface, wherein the threaded outer surface threadedly-engages a corresponding one of the threaded holes.

19 Claims, 12 Drawing Sheets

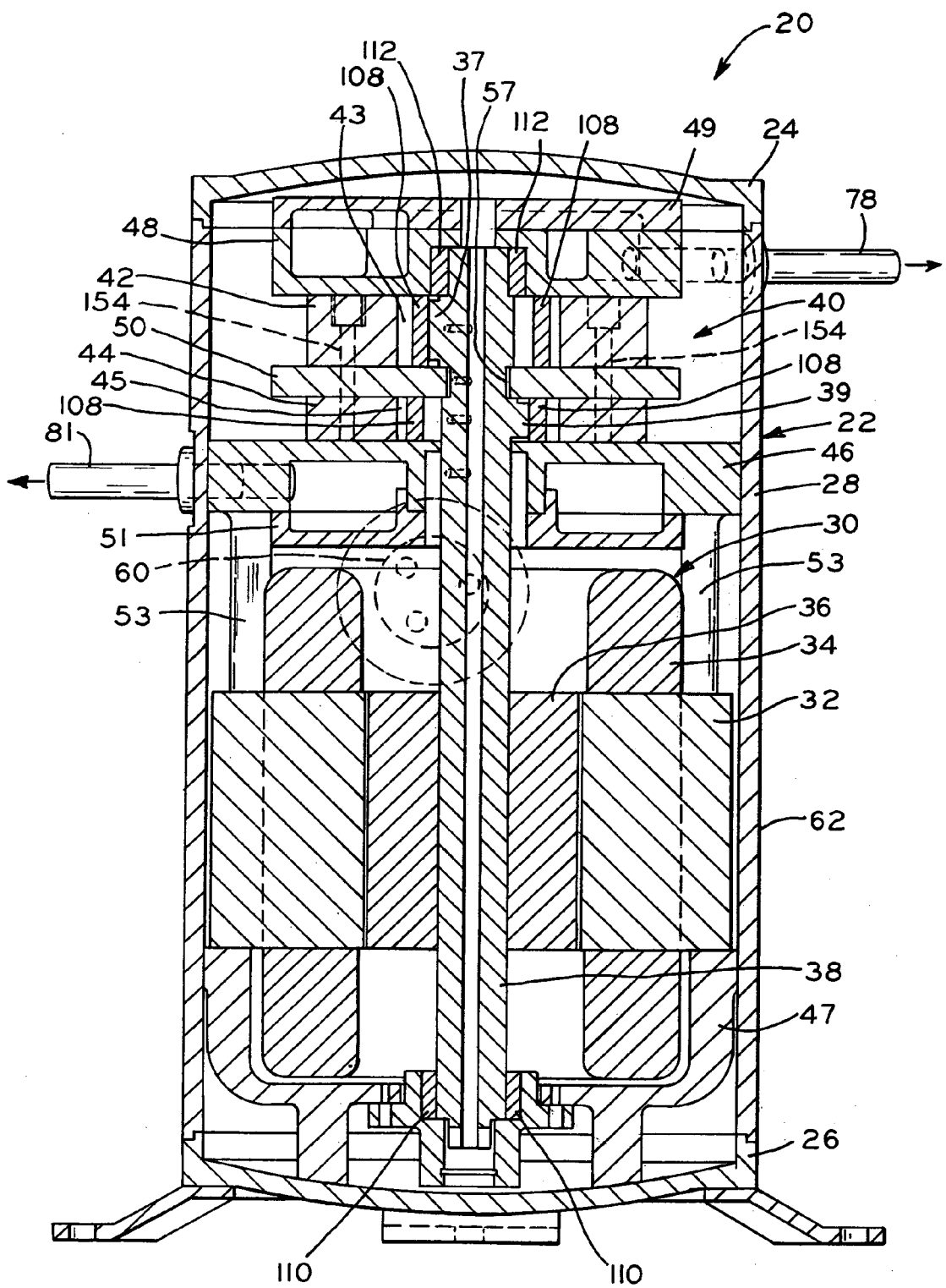
FIG_1

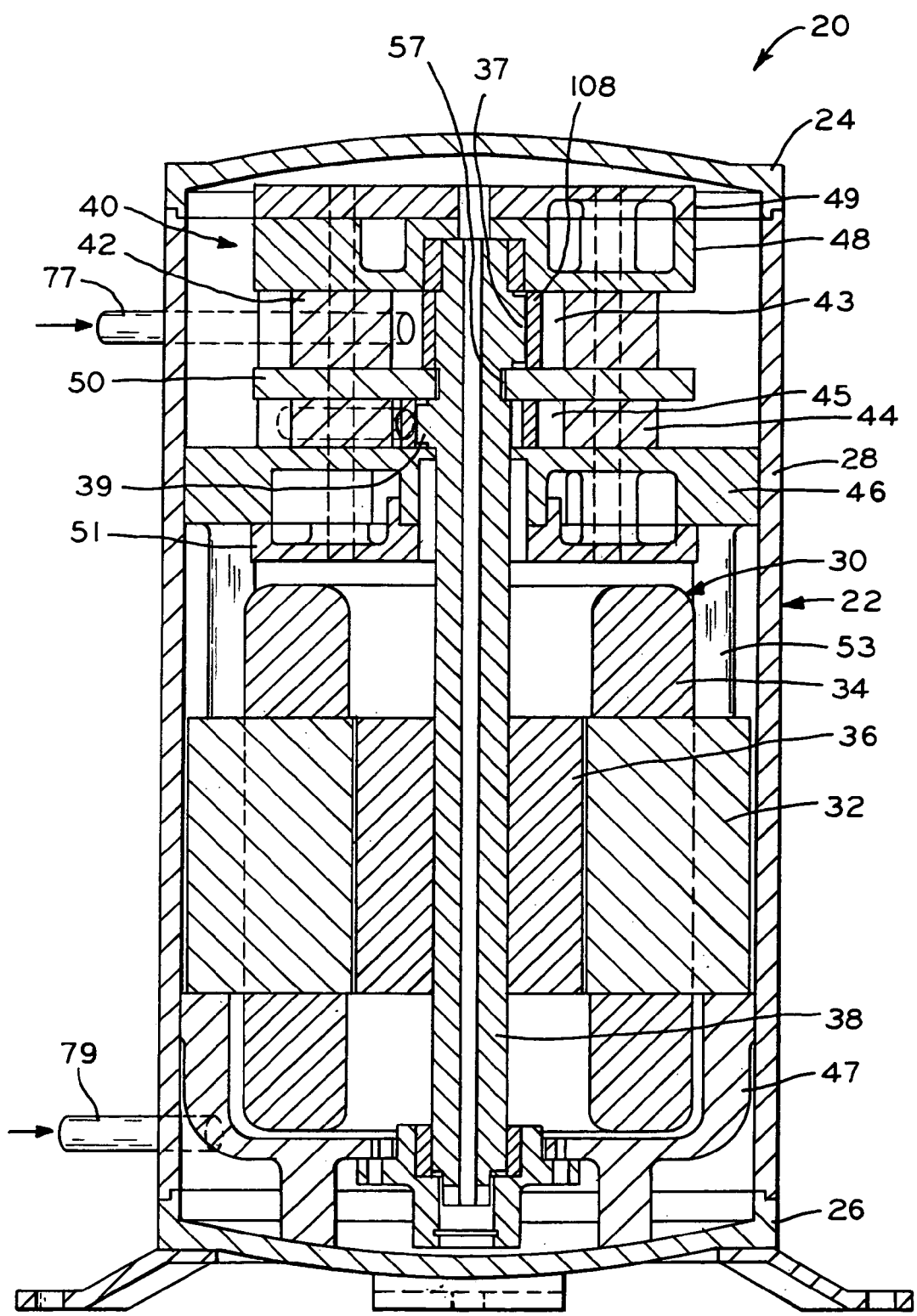
FIG_2

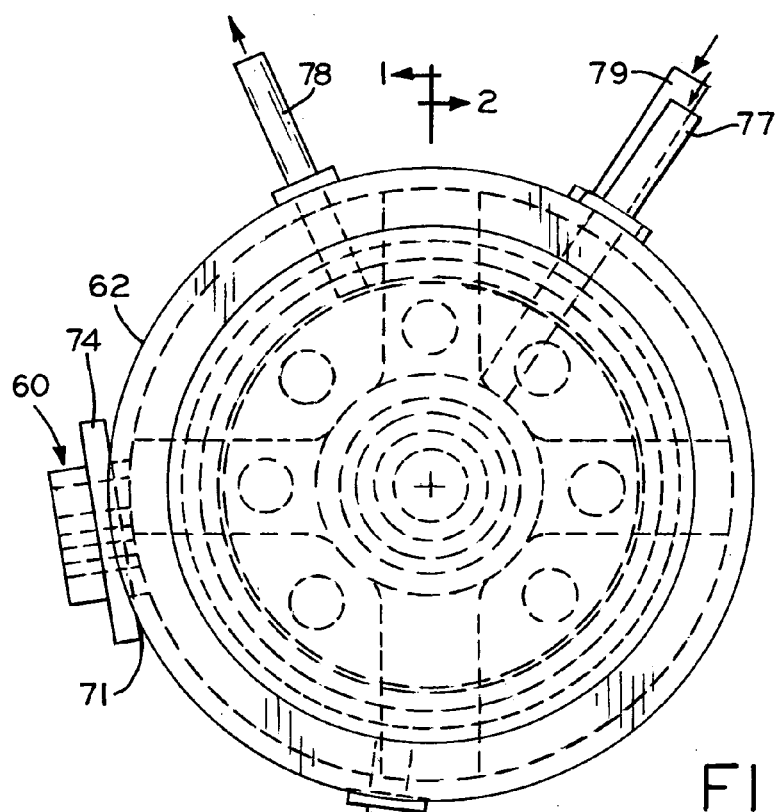
FIG._3
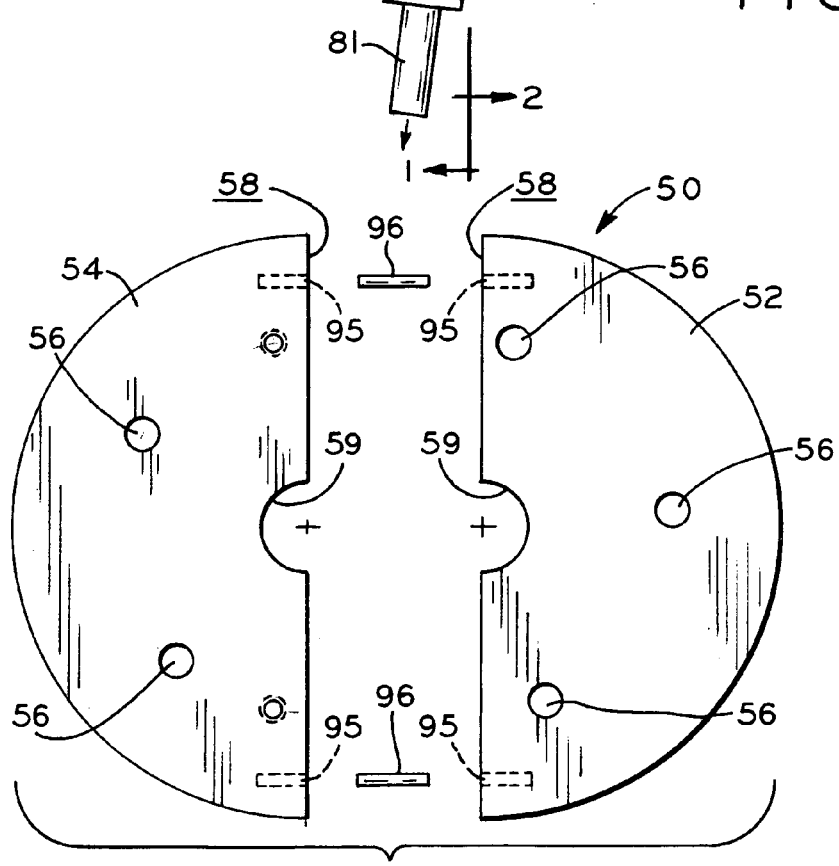
FIG._5
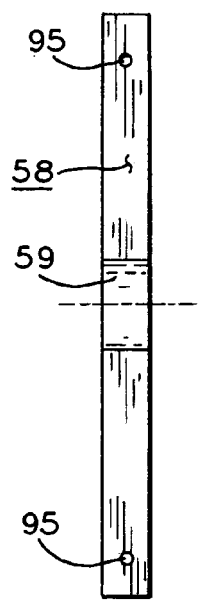
FIG._5A

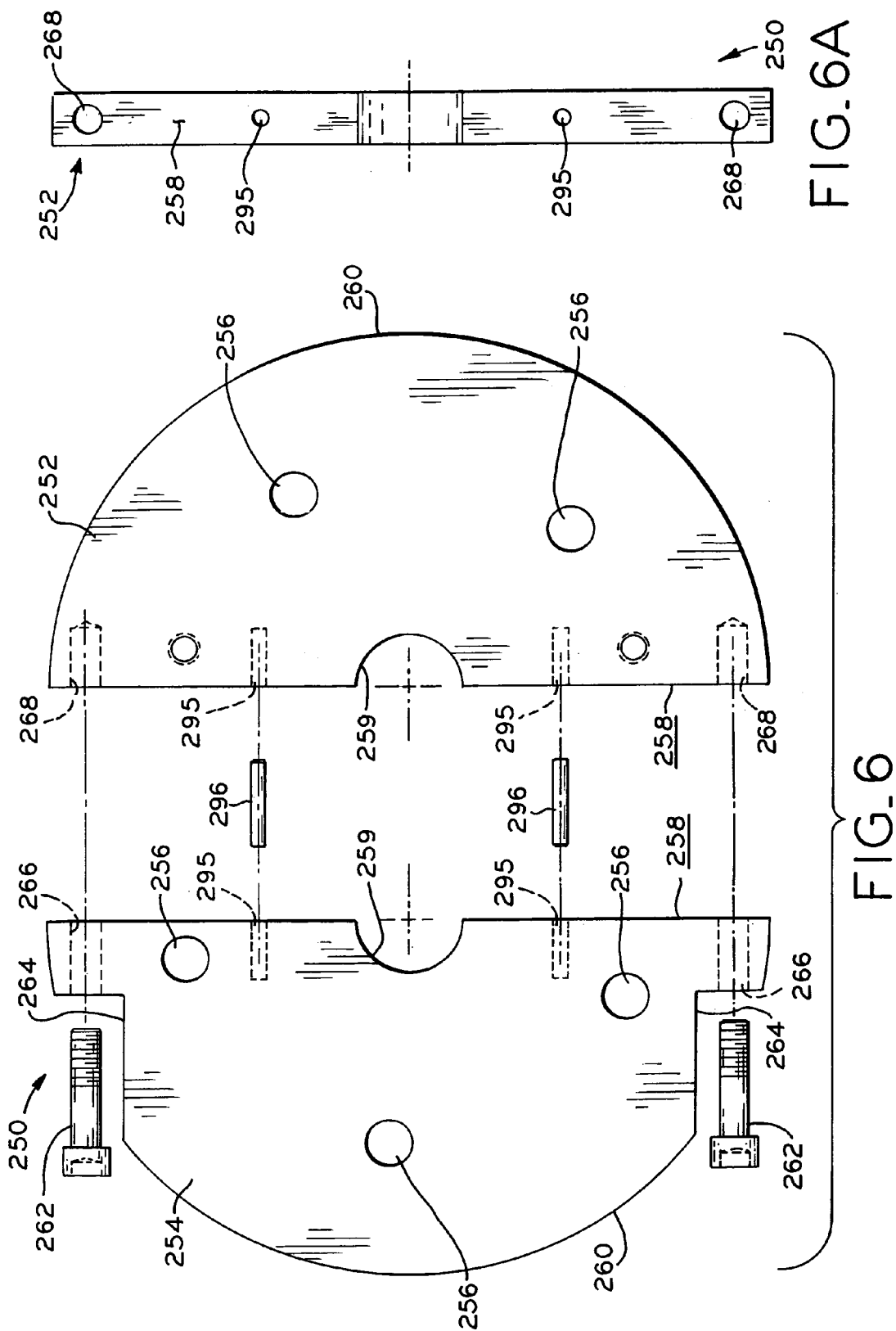

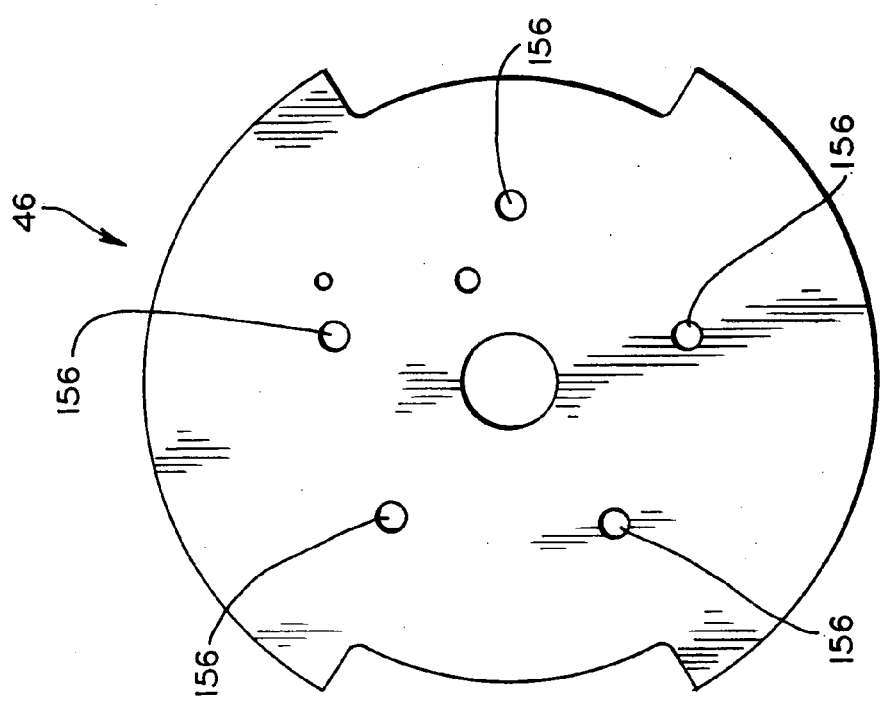
FIG_11
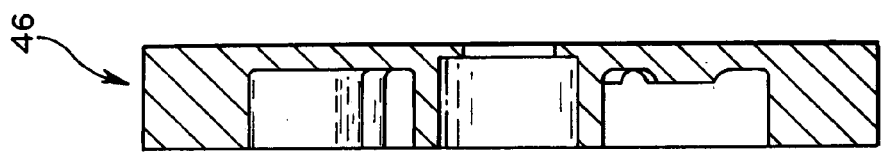
FIG_10
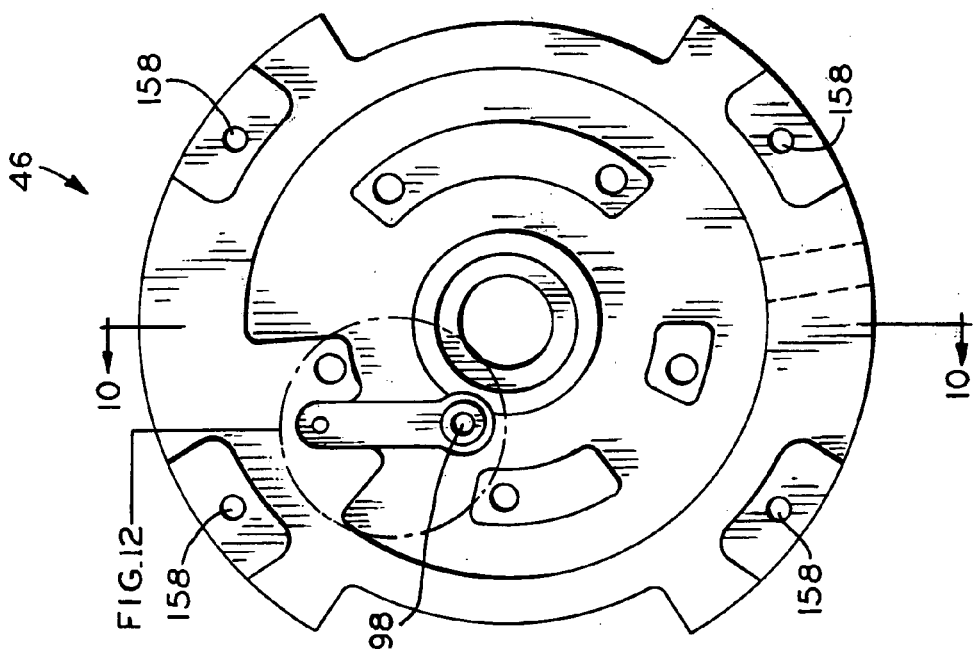
FIG_9

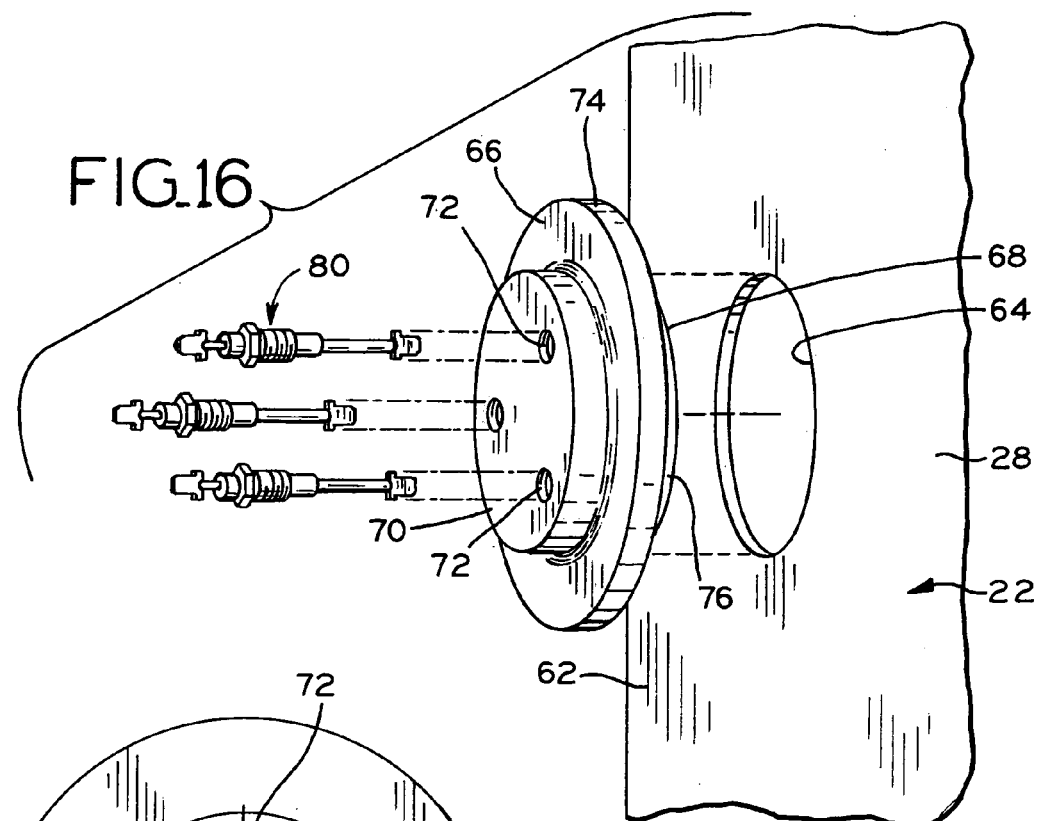
FIG_16
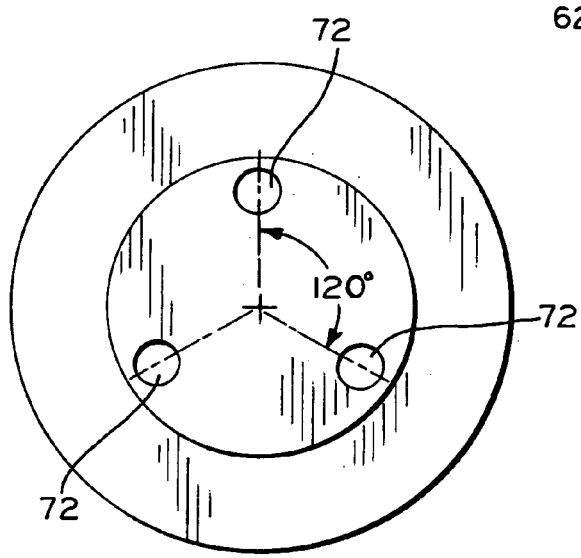
FIG_17
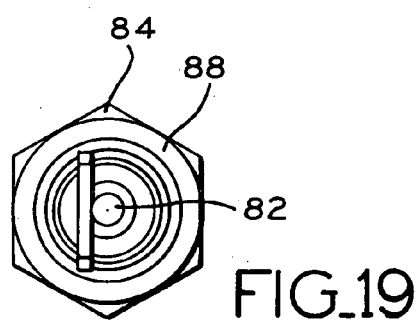
FIG_19
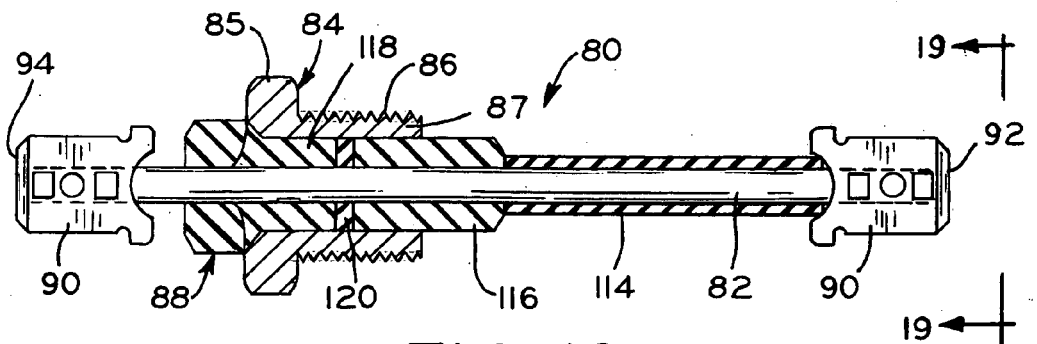
FIG_18

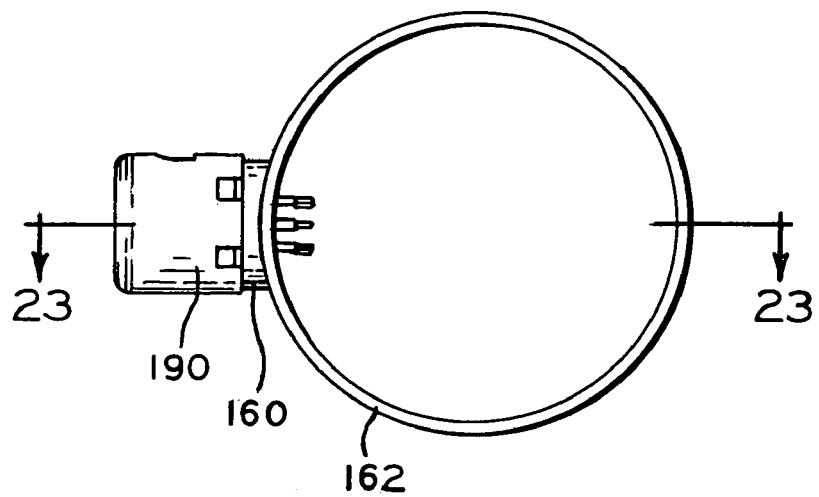
FIG_22
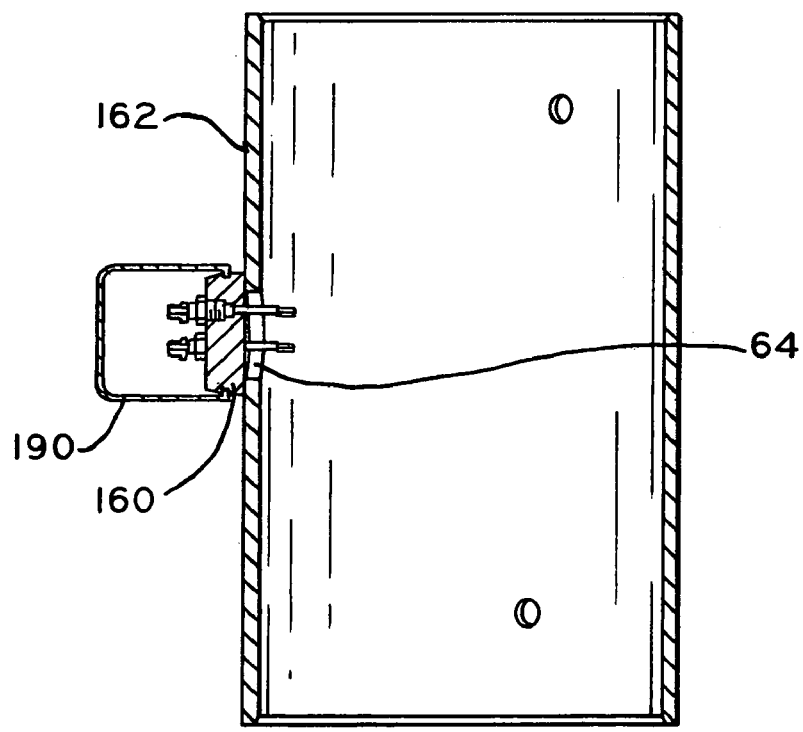
FIG_23

TERMINAL BLOCK ASSEMBLY FOR A HERMETIC COMPRESSOR

BACKGROUND OF THE INVENTION

1. Field of the Invention

The present invention pertains to hermetically sealed, positive displacement compressors for use in refrigeration systems such as air conditioners, refrigerators and the like, and methods for assembling such compressors.

2. Description of the Related Art

Various types of positive displacement compressors have been used in refrigeration systems including, for example, reciprocating piston, rotary vane, and scroll type compressors. In addition, multi-cylinder compressors, such as twin cylinder rotary compressors, are also known in the art. In general, twin cylinder rotary compressors comprise a housing containing a motor and a compression mechanism. The compression mechanism includes two cylinders, each defining a bore. The motor generally includes a crankshaft that extends through the two cylinders and has two eccentric portions, one located in the bore of each cylinder. The crankshaft is driven by the rotor of a motor having a stator which is connected to a power source via a terminal assembly. The motor rotates the crankshaft which, in turn, rotates the eccentric portions within the bores of the cylinders. Each eccentric portion has a roller piston rotatably mounted thereon, which revolves within the bore and cooperates with one or more sliding vanes and the cylinder wall to provide a pumping action for compressing a refrigerant within the cylinder bore.

Terminal assemblies, as described above, provide power to the stator. Prior terminal assemblies, generally, include a terminal body and a plurality of conductor pins. The terminal body is typically cup-shaped and is mounted in an aperture within the wall of the compressor housing. The terminal body has a plurality of holes each defined by a collar or annular lip. The conductor pins extend through and are secured within the holes by the annular lip and an insulating glass seal, which electrically insulates the pins from the terminal body. The interior ends of the conductor pins are connected to lead wires running to the stator and the exterior ends of the conductor pins are connected to a source of electrical power.

In order to prevent refrigerant leakage and accommodate the high pressures within the compressor, parts of the compressor are machined to extremely close tolerances and the compressor housing is hermetically sealed. In the case of the terminal assembly, the terminal body of the assembly is tightly fitted within an aperture of the compressor housing and is then sealed to the wall of the housing, typically by welding, brazing or the like. Ideally, terminal assemblies are assembled prior to mounting and welding the terminal body to the housing. However, the cup-shaped terminal body of prior terminal assemblies are often unable to withstand the high heat of welding or brazing. Consequently, the subsequent welding of the pre-assembled terminal assembly to the housing often results in damage to the terminal body, insulators and/or the conductive pins. In addition, the interior of compressors using carbon dioxide as a working fluid reaches substantially high temperatures and pressures. Prior terminal assemblies, particularly the mounting of the conductive pins within the holes of the terminal body, are often unable to withstand the high pressures created in these compressors. Therefore, a need remains for a terminal assembly that can better endure the welding process by which the terminal assembly is fixed to the compressor housing and is better able to withstand the higher pressures and temperatures experienced in a hermetic compressor using carbon dioxide as the refrigerant.

In addition, prior compressors often required extensive machining of the housing and the housing aperture to achieve a tight fit between the terminal body and the aperture of the housing. Such extensive machining adds difficulty, time and expense to the assembly process. Therefore a need remains for a terminal assembly that can be installed on the housing without the need for extensive machining of the housing.

SUMMARY OF THE INVENTION

The present invention provides a terminal assembly having a thick metallic disk that includes first diameter portion, which fits within an aperture of a compressor housing, and a second diameter portion, which abuts the housing wall. The metallic disk includes a plurality of holes each having a threaded surface which threadedly engages a threaded collar of a pin assembly to secure the pin assembly within the hole. The thick metallic disk is capable of enduring the heat of hermetic sealing and withstanding the pressure of carbon dioxide refrigerant compression without causing damage or deformity to the disk, pin assemblies, and/or lead wires. In addition, the threaded engagement between the pin assemblies and the disk holes are capable of withstanding the high pressures encountered within a carbon dioxide compressor.

One embodiment of the present invention provides a terminal assembly for a hermetic compressor having a housing with an aperture. The terminal assembly includes a metallic disk having an interior side, an opposite exterior side, and a plurality of holes extending therethrough. The interior side of the metallic disk defines a first diameter, which is sized to snugly fit within the aperture of the housing. The metallic disk further defines a second diameter, which is adjacent to and larger than the first diameter. The terminal assembly also includes a plurality of terminal pin assemblies, each one of which are received in a corresponding one of the plurality of holes in the metallic disk. The terminal assembly endures the heat of hermetic sealing and withstands the burst pressure of carbon dioxide compression without damage or deformity to the disk, pin assemblies, and/or lead wires.

In another embodiment, the present invention provides a terminal assembly for a hermetic compressor including a metallic disk having a plurality of threaded holes extending therethrough; and a plurality of terminal pin assemblies which each include an elongate conductive pin, an annular collar disposed about the conductive pin and having a threaded outer surface, and an electrical insulator disposed between and fixing the conductive pin and the annular collar. The threaded collar of each of the pin assemblies is threadedly received in a corresponding one of the threaded holes in the disk, thereby securing the pin assemblies within the holes in a screw-type arrangement. Such arrangement is capable of withstanding the high pressures of a carbon dioxide compressor.

The present invention further provides a method of assembling a hermetic compressor including the steps of mounting a metallic disk having a plurality of holes to a housing of a compressor by insertion of a first diameter portion of the metallic disk into an aperture of the housing until a second larger diameter portion of the metallic disk abuts an outer surface of the housing; installing a terminal pin assembly in each one of the plurality of holes by insertion of an elongate conductive pin of the terminal pin assembly into each one of the plurality of holes; and hermetically sealing the metallic disk to the housing of the compressor. The method may also include the step of threadedly-engaging a threaded annular collar disposed about the conductive pin to a threaded surface of each one of the plurality of holes. The method may further include the step of insulating the conductive pin from the annular collar and the metallic disk by disposition of an electrical insulator between the conductive pin and the annular collar. Because the metallic disk is capable of withstanding high heat and pressures, the step of installing the terminal pin assemblies in the holes may be performed before or after the steps of mounting and welding the metallic disk on the housing.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein:

FIG. 1 is a first sectional view of a hermetic compressor according to the present invention;

FIG. 2 is a second sectional view of the hermetic compressor of FIG. 1;

FIG. 3 is a top view of the compressor of FIG. 1;

FIG. 5 is a top view of a two-piece separator plate according to one embodiment of the present invention;

FIG. 5A is an interior side view of either piece of the separator plate of FIG. 5;

FIG. 6 is a top view of a two-piece separator plate according to another embodiment of the present invention;

FIG. 6A is an interior side view of a first piece of the separator plate of FIG. 6;

FIG. 9 is a bottom view of the crankcase of FIG. 7;

FIG. 10 is a sectional view of the crankcase of FIG. 7 taken along lines 10—10;

FIG. 11 is a top view of the crankcase of FIG. 7;

FIG. 16 is an exploded view of the terminal block assembly of FIG. 14 in relation with the housing of a hermetic compressor according to the present invention;

FIG. 17 is a plan view of the terminal block assembly of FIG. 14;

FIG. 18 is an enlarged sectional view of a pin assembly according to the present invention;

FIG. 19 is an end view of the pin assembly of FIG. 18 along lines 19—19;

FIG. 22 is a top view of the terminal assembly and protective cover of FIG. 20 installed on a compressor housing according to the present invention;

FIG. 23 is a sectional view of the terminal assembly and protective cover of FIG. 22 taken along lines 23—23;

DETAILED DESCRIPTION

Figure 4:
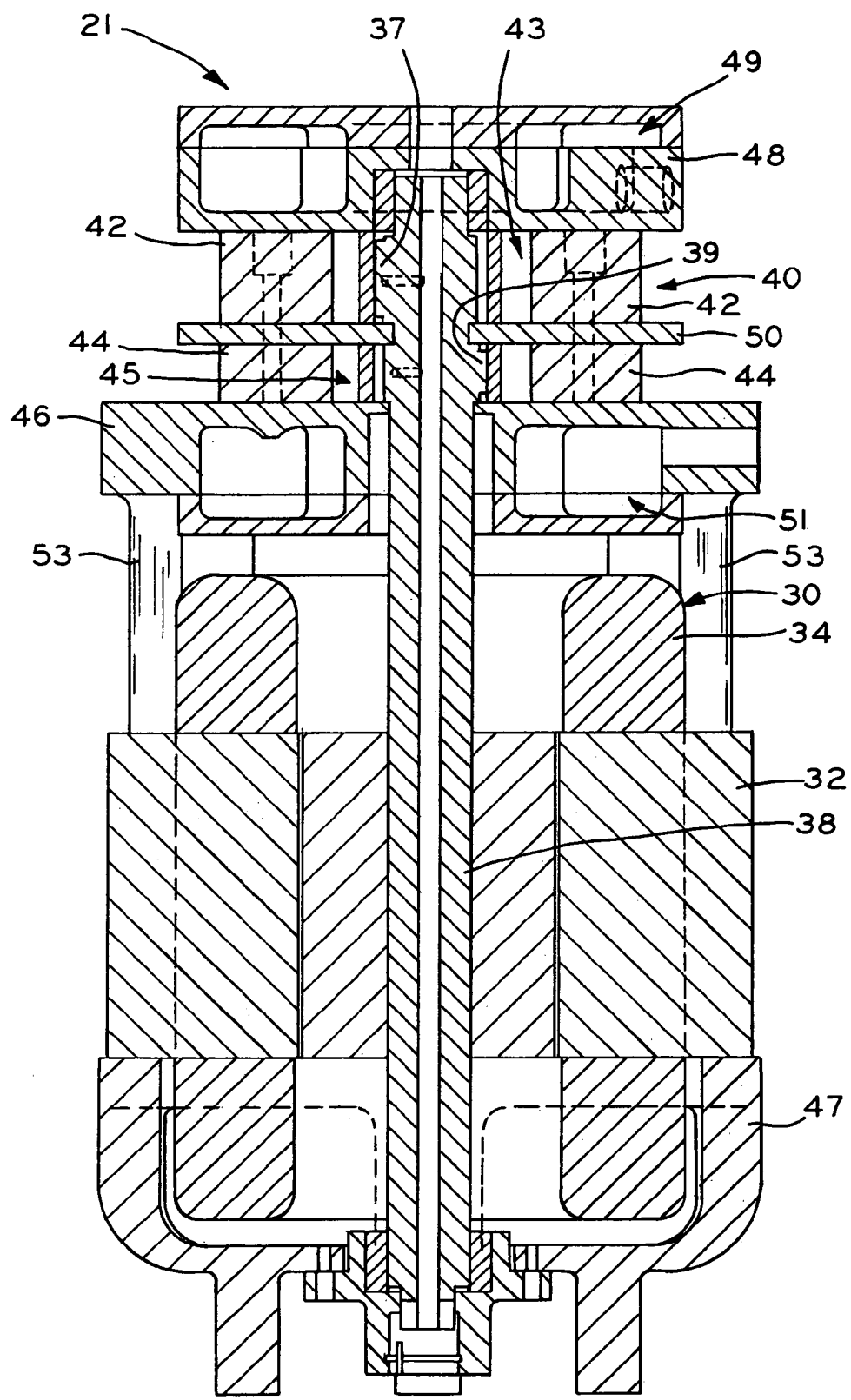
FIG. 4 is a sectional view of the compressor sub-assembly (without the housing) of FIG. 1.

The embodiments disclosed herein are not intended to be exhaustive or limit the invention to the precise forms disclosed in the following description. Rather the embodiments are chosen and described so that others skilled in the art may utilize its teachings.

Referring to FIG. 1, hermetic compressor 20 comprises housing 22 which includes upper housing 24, lower housing 26, and cylindrical main housing 28. As better illustrated in FIG. 16, aperture 64 is defined in wall 62 of main housing 28. Returning now to FIG. 1, housing portions 24, 26 and 28 are formed of sheet steel and hermetically sealed by a method such as welding, brazing, or the like. Alternatively, either upper housing 24 or lower housing 26 may be integrally-formed with main housing 28. Disposed within housing 22 is motor 30 and compression mechanism 40. Motor 30 includes rotor 36, which is surrounded by stator 32 and fixed to crankshaft 38. Stator 32 includes windings 34, which are connected by lead wires (not shown) to a power source (not shown) via terminal assembly 60. Stator 32 is secured at one end to legs 53 of crankcase or main bearing 46 and at the opposite end to lower outboard bearing 47. Discharge muffler 51 is disposed between main bearing 46 and motor 30.

Compression mechanism 40 includes first cylinder 42 and second cylinder 44, each having a cylindrical chamber 43 and 45, respectively. First and second cylinders 42, 44 are separated by separator plate 50, which has a central bore 57. Chamber 43 of first cylinder 42 receives gas, which may be, for example, carbon dioxide or any other suitable refrigerant, at substantially suction pressure, through intake tube 77. Intermediate pressure muffler 49 is disposed on upper outboard bearing 48 and upper outboard bearing 48 is disposed adjacent first cylinder 42. Upper outboard bearing 48 includes intermediate discharge tube 78, which is in communication with chamber 43 of first cylinder 42. Intermediate discharge tube 78 is also in communication with chamber 45 of second cylinder 44 through intermediate suction tube 79 (FIGS. 2 and 3). Intermediate discharge tube 78 and intermediate suction tube 79 are in fluid communication with each other externally of housing 22, and may comprise a common conduit.

Figure 12:
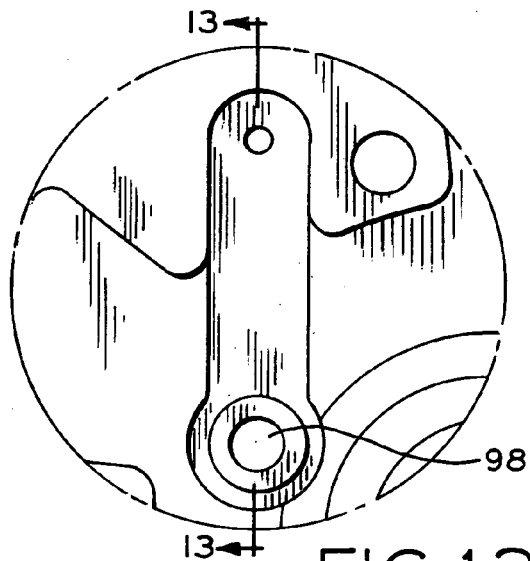
FIG. 12 is an enlarged view of the encircled region of the crankcase of FIG. 7.
Figure 13:
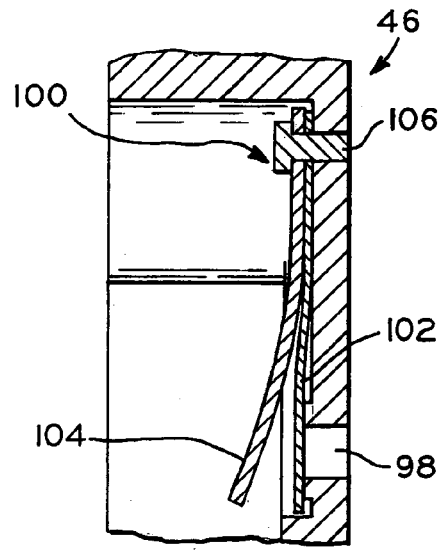
FIG. 13 is an enlarged, fragmentary sectional view of the crankcase of FIG. 7 taken along lines 13—13.
Figure 14:
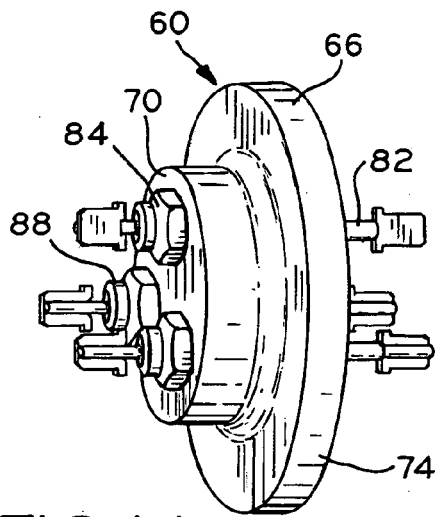
FIG. 14 is a perspective view of a terminal block assembly according to the present invention.

Second cylinder 44 is disposed adjacent to main bearing 46 and chamber 45 is in communication with discharge muffler 51 through valve opening 98 in main bearing 46 (FIGS. 9, 12 and 13). Referring to FIGS. 9, 12 and 13, valve opening 98 is equipped with a valve assembly 100 that includes resilient valve 102 sealing valve opening 98 and valve stop 104. Valve assembly 100 is secured to main bearing 46 by fastener 106. Referring back to FIGS. 1–3, discharge tube 81 is in communication with discharge muffler 51. Crankshaft 38 extends through chamber 45, bore 57, and chamber 43, and includes two eccentric portions 37, 39 mounted thereon which are disposed inside chambers 43 and 45, respectively. Roller bearings 108 provide radial support to eccentric portions 37, 39 and further seal any space between the wall of bore 57 and crankshaft 38. Crankshaft 38 is radially supported at either end in lower outboard bearing 47 and upper outboard bearing 48 by needle roller bearings 110, 112, which prevent deflection of crankshaft 38.

Turning now to FIGS. 1–3, in operation, compressor 20 receives suction pressure gas into first compression chamber 43 through tube 77, where it is compressed to an intermediate pressure and discharged into intermediate pressure muffler 49. The intermediate pressure gas is then discharged externally from compressor 22 through intermediate discharge tube 78, which extends from outboard bearing 48 and through housing 22. The intermediate pressure gas is then introduced into the motor compartment through intermediate pressure suction tube 79, and is drawn into second compression chamber 45 and compressed to discharge pressure. Referring now to FIGS. 1–3 and 13, the discharge pressure gas is discharged into discharge muffler 51 from second compression chamber through valve opening 98 in main bearing 46. More specifically, when pressure reaches a certain pre-determined limit, the pressure of the discharge pressure gas forces valve 102 to deflect away from main bearing 46, thereby exposing valve opening 98 to discharge muffler 51. The deflection of valve 102 is limited by valve stop 104. The discharge gas is then expelled from the compressor assembly through discharge tube 81, which extends from main bearing 46 and through housing 22. The displacement volume ratio of intermediate pressure gas to discharge pressure gas is approximately 1:10.

According to one embodiment of the present invention shown in FIG. 5, separator plate 50 is a two-piece separator plate having a first piece 52 and a second, complementary piece 54. As illustrated in FIGS. 5 and 5A, each of first and second pieces 52, 54 includes planar surface 58 having semi-circular central recess 59. First and second pieces 52, 54 may be paired by joining planar surfaces 58 and fastening first and second pieces using dowel 96, the ends of which are received within dowel holes 95. When first and second pieces 52, 54 are paired, semi-circular recesses 59 form bore 57, which is sized to closely surround crankshaft 38 at a location between the eccentrics. Two-piece separator plate 50 also includes bolt clearance holes 56. The two-piece plate design allows the separator plate 50 to be fitted more closely around the portion of crankshaft 38 located between eccentrics 37, 39 and sealably separate compression chambers 43 and 45.

According to another embodiment of the present invention shown in FIG. 6, separator plate 250 is a two-piece separator plate having a first piece 252 and a second, complementary piece 254. As illustrated in FIGS. 6 and 6A, each of first and second pieces 252, 254 includes annular surface 260 and planar surface 258 having semi-circular central recess 259. First and second pieces 252, 254 may be paired by joining planar surfaces 258 and fastening first and second pieces 252, 254 using dowel 296, the ends of which are received within dowel holes 295. Alternatively, or additionally, first and second pieces 252, 254 may be secured using fasteners 262, which extend through clearance apertures 266 in second piece 254 and engage threaded apertures 268 defined in interior surface 258 of first piece 252. Notches 264 may be defined in annular surface 260 of second piece 254 for receiving fasteners 262 and for housing the head of fasteners 262 within the diametric perimeter of annular surface 260. Two-piece separator plate 250 also includes bolt clearance holes 256.

In assembling compressor 20 according to the present invention, main bearing 46 is placed on a holding device with the upper side 33 facing up. Second cylinder 44 is then placed on the upper side 33 of main bearing 46 and crankshaft 38 is inserted into main bearing 46 and second cylinder 44. Roller bearing 108 is mounted on crankshaft 38 within chamber 45. First and second pieces 52, 54 of separator plate 50 are then positioned on top of second cylinder 44 and paired such that semi-circular central recesses 59 closely capture the portion of crankshaft 38 located between eccentrics 37, 39. First and second pieces 52, 54 are connected to one another using dowels 96, the ends of which are inserted into holes 95 (FIG. 5). Alternatively, first and second pieces 252, 254 of separator plate 250 may be positioned on top of second cylinder 44 and paired such that semi-circular central recesses 259 closely capture the portion of crankshaft 38 located between eccentrics 37, 39. First and second pieces 252, 254 may then be connected to one another using dowels 296 and/or fasteners 262. Roller bearing 108 is mounted on crankshaft 38 and first cylinder 42 is then positioned on separator plate 50 such that roller bearing is disposed within chamber 43.

Figure 7:
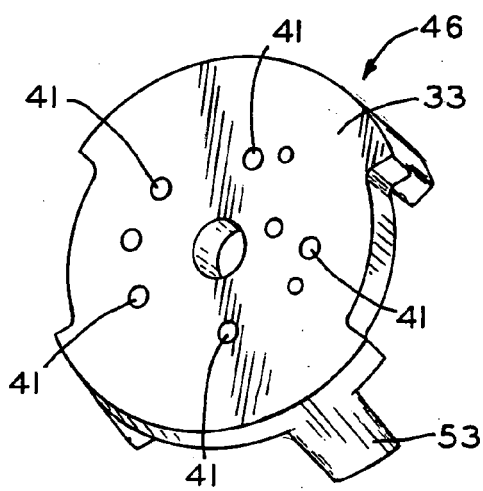
FIG. 7 is a top perspective view of a crankcase according to the present invention.

Outboard bearing 48 and intermediate discharge muffler 49 are then positioned atop first cylinder 42 and five bolts (represented by dashed lines 154 in FIG. 1) are placed through clearance holes in intermediate discharge muffler 49, outboard bearing 48, first cylinder 42, two-piece separator plate 50, and second cylinder 44, and engage threaded holes 41 (FIG. 7) in the upper side 33 of main bearing 46. Next, main bearing 46 is removed from the holding device and annular discharge muffler 51 is positioned on the underside 35 of main bearing 46 between legs 53. Five bolts are then inserted through clearance holes in discharge muffler 51 and engage one end of threaded holes 41 at the underside 35 of main bearing 46 (FIG. 8) to secure discharge muffler 51 to main bearing 46. Alternatively, the five bolts 154 extending through intermediate discharge muffler 49, outboard bearing 48, first cylinder 42, two-piece separator plate 50, second cylinder 44, and holes 41 can be lengthened to further extend completely through holes 41 and discharge muffler 51 and can be secured with nuts.

Figure 8:
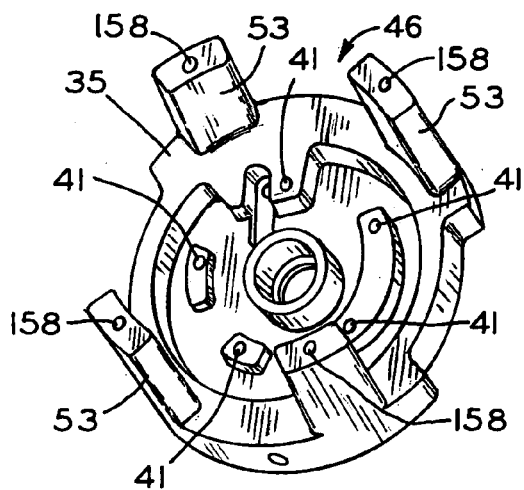
FIG. 8 is bottom perspective view of the crankcase of FIG. 7.

Crankshaft 38 is then affixed to rotor 36 by heat-shrinking. Stator 32 is then placed over rotor 36, and outboard bearing 47 is positioned over the end of stator 32 and rotor 36. Four threaded bolts or like fasteners (not shown) are inserted into clearance holes (not shown) provided in outboard bearing 47 and stator 32. Bolts are then threaded into four threaded holes 158 provided in the ends of legs 53 of main bearing 46 (FIG. 8).

The resulting compressor sub-assembly 21, shown in FIG. 4, is then installed in housing 22 by, first, heat-expanding main housing 28, and inserting compressor sub-assembly 21 into main-housing 28 (FIG. 1). Main housing 28 can then be shrink-fitted onto sub-assembly 21, such that sub-assembly 21 is in contact with the housing at the peripheries of main bearing 46 and outboard bearing 47. The upper and lower housing portions are then welded to the main housing portion 28 to hermetically seal compressor 20. Tubes 77, 78, 79, and 81 are then inserted into openings (not shown) in housing 28 such that the inner portion of tubes 77, 78, 79 and 81 extend into openings (not shown) in first cylinder 42, outboard bearing 48, outboard bearing 47 and main bearing 46, respectively. The openings in first cylinder 42, outboard bearing 48, outboard bearing 47 and main bearing 46 are provided with a seal, such as an o-ring, to sealingly receive tubes 77, 78, 79 and 81. The outer portion of tubes 77, 78, 79 and 81 are then sealed to housing 38 by welding, brazing or the like.

Figure 15:
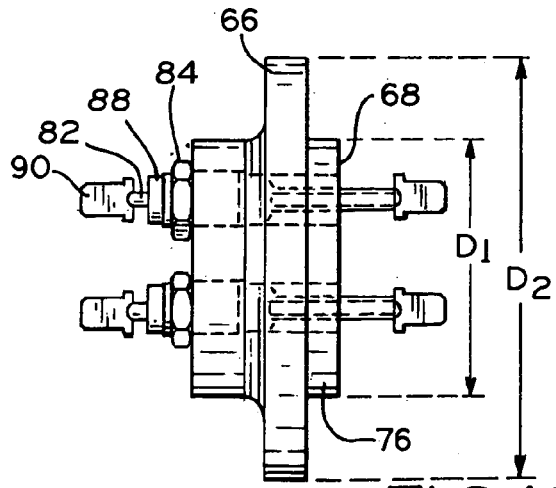
FIG. 15 is a side view of the terminal block assembly of FIG. 14.
Figure 20:
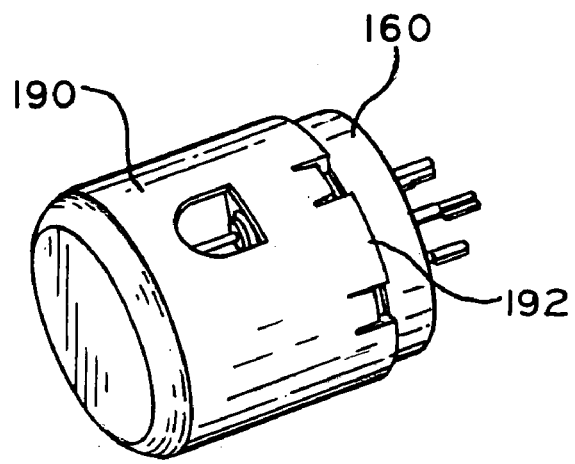
FIG. 20 is a perspective view of a second embodiment terminal assembly and protective cover according to the present invention.

With reference to FIGS. 14–19, according to one embodiment of the present invention, terminal assembly 60 generally includes machined metallic disk 66 and three pin assemblies 80. Disk 66 includes three equally spaced-apart, threaded holes extending therethrough. Referring particularly to FIGS. 15 and 16, interior side 68 of disk 66 defines a first diameter portion 76 having diameter $D_1$ sized to snugly fit within aperture 64 in wall 62 of housing 22. Disk 66 also includes a second diameter portion 74 adjacent first diameter portion 76 and having diameter $D_2$, which is larger in diameter than both $D_1$ and aperture 64. As shown in FIGS. 3 and 16, first diameter portion 76 of disk 66 fits into aperture 64. Second diameter portion 74 abuts wall 62, thereby restricting further movement of disk 66 into aperture 64 and providing a sealing region 71 between the surface of second diameter portion 74 and housing wall 62. Disk 66 is hermetically sealed to housing wall 62 at sealing region 71 by welding, brazing or other means.

Turning now to FIGS. 18 and 19, each pin assembly 80 includes an elongate conductive pin 82, electrical insulator 88 disposed about pin 82, annular collar 84 disposed about a portion of electrical insulator 88, and tabs 90 positioned at both the stator end 92 and power source end 94 of pin 82. Electrical insulator 88 includes Teflon® sleeve 114 extending along a length of pin 82 at stator end 92, sintered glass portions 116, and a fused glass portion 118. Between fused glass portion 118 and one of the sintered glass portions 116 is freon-proof epoxy resin 120, and parts of both fused glass portion 118 and sintered glass portion 116 are disposed between pin 81 and annular collar 84. Annular collar 84 includes hexagonal head portion 85 and shaft portion 87, which includes threaded outer surface 86. Each pin assembly 80 is received in a corresponding one of threaded holes 72 in disk 66 and is secured in hole 72 via a threaded engagement between threaded collar surface 86 and threaded surface of hole 72. In this threaded engagement, pin assemblies 80 are more securely fixed in holes 72, and therefore, are capable of withstanding the high pressures created in carbon dioxide compressors.

As is typical in the art, the compressor end 92 of pin 82 may be connected to lead wires (not shown) extending from stator windings 34 via a connector clip, cluster block or other electrical connecting means. The power source end 94 of pin 82 is appropriately connected to a power source (not shown) to provide power to pin 82 and, ultimately, to stator 32.

Disk 66 is of substantial thickness, the overall thickness of disk 66 as measured between exterior side 70 and interior side 68 is, preferably, about one inch. However, thickness can vary, provided that disk 66 is thick enough to endure the heat of hermetic sealing and the pressures of carbon dioxide compression without damage or deformity to disk 66, pin assemblies 80, and/or lead wires. Second diameter portion 74, particularly, should be of substantial thickness, preferably, about 0.300 inches. First diameter portion 76 should have sufficient thickness to securely fit into aperture 64, preferably, about 0.200 inches.

This terminal assembly withstands the heat of welding and the pressures created in a carbon dioxide compressor, and therefore, provides a more robust compressor assembly design. In one embodiment of the present invention, the terminal assembly is assembled by, first, mounting metallic disk 66 on housing 22 by inserting first diameter portion 76 into aperture 64 until second larger diameter portion 74 of metallic disk 66 abuts outer wall 62 of housing 22. Then second diameter portion 74 is hermetically sealed to housing outer wall 62 by welding, brazing or other sealing means. Finally, terminal pin assemblies 80 are inserted into holes 72 and annular collars 84 are secured to hole 72 in a screw-type engagement.

Alternatively, the terminal assembly can be assembled prior to welding disk 66 to wall 62 of housing 22. In this case, terminal assembly 60 is assembled by, first, installing terminal pin assemblies 80 within holes 72, as described above. With the pin assemblies 80 threadedly secured in holes 72, metallic disk 66 is mounted in aperture 64 and second diameter portion 74 is hermetically sealed to outer wall 62 without causing damage to disk 66, pin assemblies 80 and/or lead wires.

Figure 21:
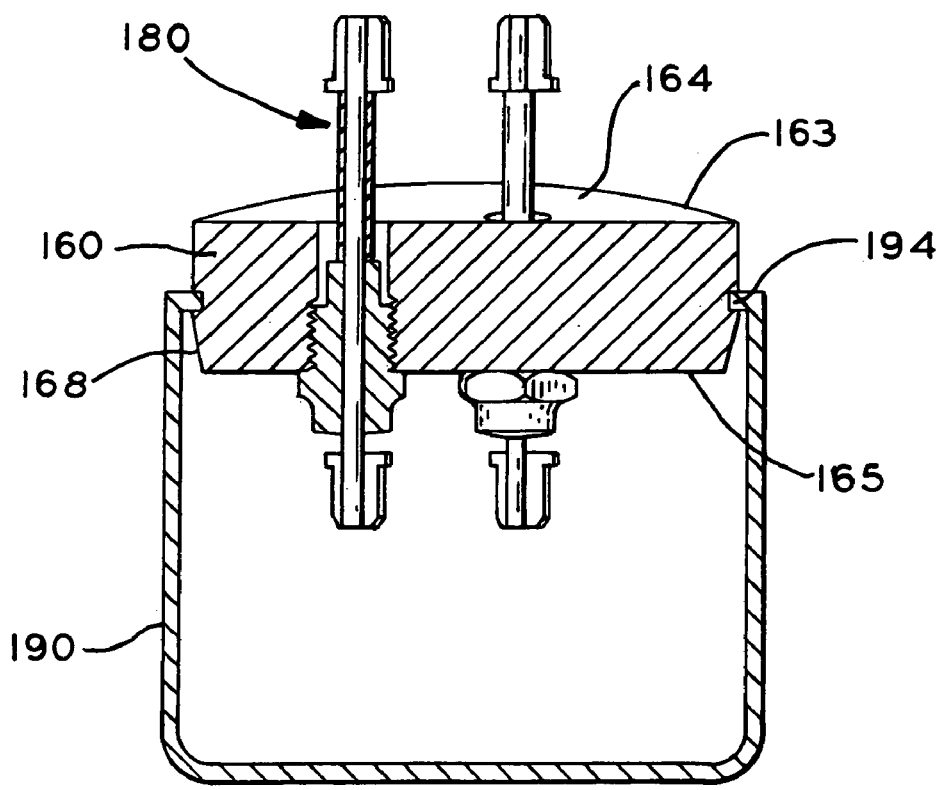
FIG. 21 is a sectional view of the terminal assembly and protective cover of FIG. 20.
Figure 24:
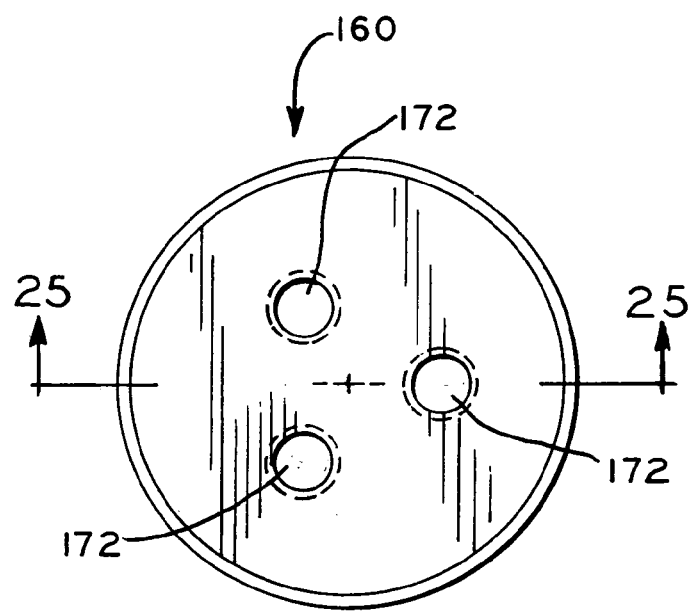
FIG. 24 is a plan view of the terminal block of the terminal assembly FIG. 20.

According to another embodiment of the present invention exemplified in FIGS. 20–27, terminal block 160 has a concave mating surface 164 having a radius of curvature that corresponds to the curvature of housing wall 162, such that mating surface 164 of terminal block 160 can lie flush against housing wall 162. Housing wall 162 may be substantially identical to housing wall 62 described herein above. Terminal block 160 is mounted on housing wall 162 by welding, brazing or the like. As can be seen in FIGS. 21 and 24, terminal block 160 also includes three equally-spaced, tapped and threaded holes 172 extending therethrough, which receive terminal pin assemblies 180 in a threaded-engagement as described above with respect to pin assemblies 80. Because terminal block 160 does not fit closely within aperture 164 in housing wall 162, tolerances of aperture 164 may be loosely held.

Figure 25:
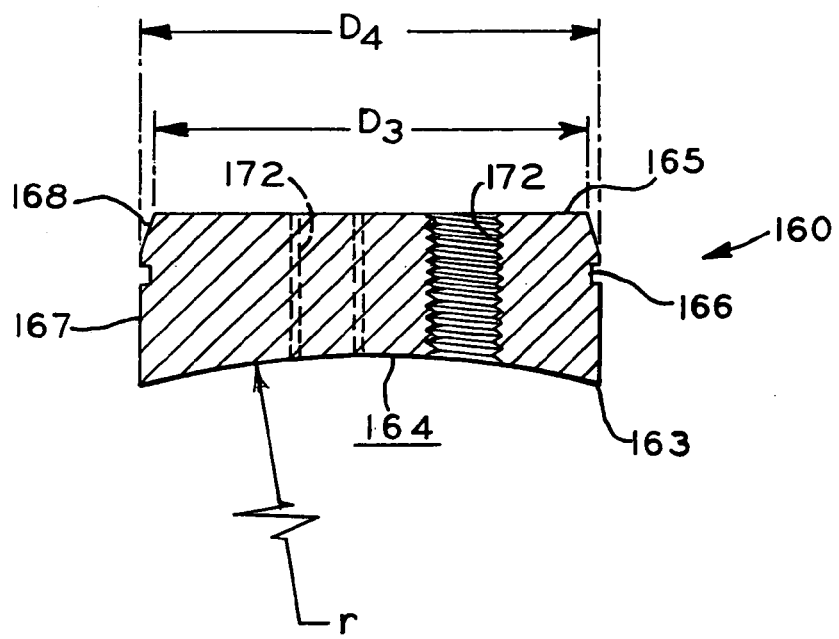
FIG. 25 is a sectional view of the terminal block of FIG. 24 taken along lines 25—25.
Figure 26:
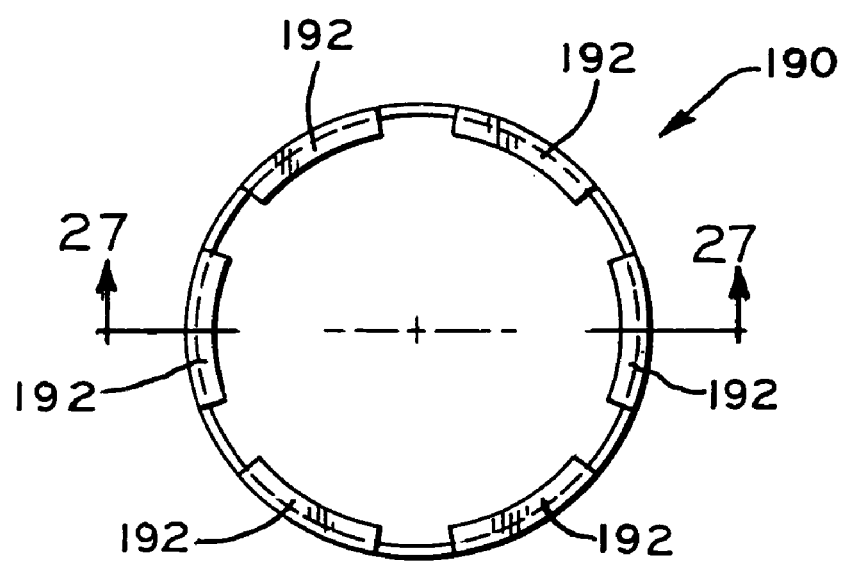
FIG. 26 is an interior plan view of the protective cover of FIG. 22.
Figure 27:
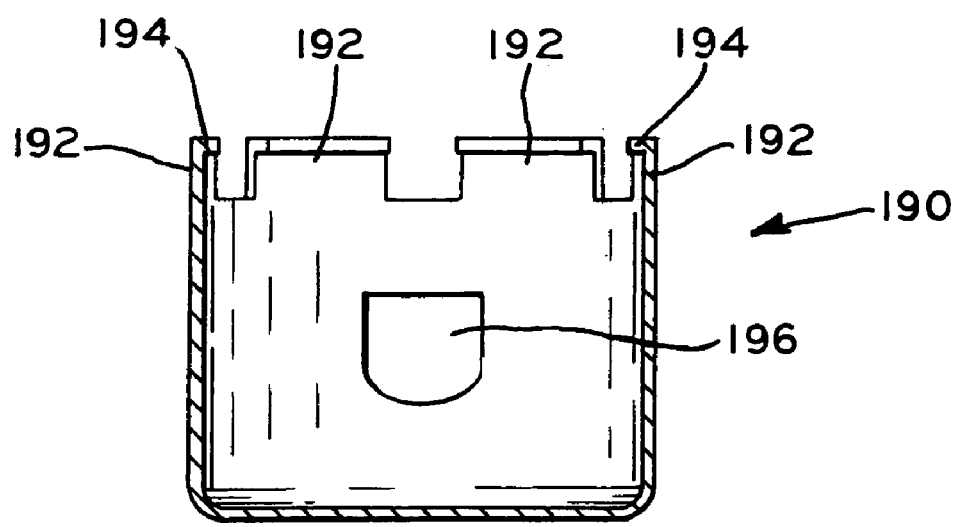
FIG. 27 is a sectional view of the protective cover of FIG. 26 taken along lines 27—27.

As illustrated in FIG. 25, terminal block 160 may also include annular grove 166 about a circumference of terminal block 160 and frustoconical guide surface 168 adjacent thereto, which slopes from a first diameter $D_3$ to a larger second diameter $D_4$ such that guide surface 164 is tapered. Both annular groove 166 and tapered guide surface 164 cooperate to receive a snap-fit protective cover, such as cover 190 illustrated in FIGS. 20-21 and 26-27. Cylindrical cover 190 may be formed of plastic or sheet metal, and includes six, equally spaced-apart, resilient legs 192. Each leg 192 includes lip 194 that is shaped and sized to fit within annular groove 166. To install cover 190 on terminal block 160, resilient legs 192 are urged along tapered guide surface 164, causing resilient legs 192 to flex outward. When lip 194 reaches groove 164, resilient legs 192 spring inwards, snapping lip 194 into groove 164, thereby locking cover 190 onto terminal block 160. Cover 190 also includes a D-shaped hole 196 through which a conduit wire assembly leading from the power source can extend. Cover 190 protects the terminal assembly from damage during operation and is relatively easy to install.

While this invention has been described as having an exemplary design, the present invention may be further modified within the scope of this disclosure. This application is therefor intended to cover any variations, uses, or adaptations of the invention using its general principles. Further, this application is intended to cover such departures from the present disclosure as come within known or customary practice in the art to which this invention pertains.

What is claimed is:

1. A terminal assembly for a hermetic compressor having a housing with an aperture comprising:
   a substantially disk shaped body having an interior side including a first diameter portion sized to fit within the aperture of the housing, an opposite exterior side including a second diameter portion adjacent said first diameter portion and sized larger than said first diameter portion, and a plurality of holes each having a substantially uniform diameter therealong, each of said holes extending through thicknesses of both said first diameter portion and said second diameter portion; and a plurality of terminal pin assemblies, each one of said terminal pin assemblies received in a corresponding one of said plurality of holes.

2. The terminal assembly of claim 1 wherein each of said pLurality of holes is threaded and each of said terminal pin assemblies comprises:

an elongate conductive pin; and an annular collar disposed about said conductive pin and having a threaded outer surface, wherein said threaded outer surface threadedly-engages a corresponding one of said threaded holes.

3. The terminal assembly of claim 2 wherein each of said terminal pin assemblies further includes an electrical insulator disposed between and fixing said conductive pin and said annular collar.

4. A terminal assembly for a hermetic compressor having a housing with an aperture, comprising:

a substantially disk shaped body having a first diameter portion sized to fit within the aperture of the housing and defining an interior side, a second diameter portion adjacent said first diameter portion and sized larger than said first diameter portion and defining an opposite exterior side, and a plurality of threaded holes each having a substantially uniform diameter therealong, each of said holes extending through thicknesses of said first diameter portion and said second diameter portion of said body; and a plurality of terminal pin assemblies, each of said terminal pin assemblies comprising:

an elongate conductive pin, an annular collar disposed about said conductive pin and having a threaded outer surface, and an electrical insulator disposed between and fixing said conductive pin and said annular collar, wherein said threaded collar of each of said pin assemblies is threadedly received in a corresponding one of said threaded holes.

5. The terminal assembly of claim 4 wherein said interior side of metallic disk defines a first diameter sized to fit within an aperture of the hermetic compressor and said metallic disk defines a second diameter adjacent said first diameter and sized larger than said first diameter.

6. A method of assembling a hermetic compressor assembly comprising the steps of:

mounting a substantially disk shaped body having a plurality of holes each having a substantiall uniform diameter therealon each of said holes extending through thicknesses of both a first diameter portion and a second larger diameter portion, to a housing of a compressor by insertion of a first diameter portion of the metallic disk into an aperture of the housing until a second larger diameter portion of the metallic disk abuts an outer surface of the housing;

installing a terminal pin assembly in each one of the plurality of holes by insertion of an elongate conductive pin of the terminal pin assembly into each one of the plurality of holes; and hermetically sealing the metallic disk to the housing of the compressor.

7. The method of claim 6 wherein said step of installing a pin assembly in each one of the plurality of holes further includes threadedly-engaging a threaded annular collar disposed about the conductive pin to a threaded surface of each one of the plurality of holes.

8. The method of claim 7 further comprising the step of insulating the conductive pin from the annular collar and the metallic disk by disposition of an electrical insulator between the conductive pin and the annular collar.

9. The method of claim 6 wherein said step of hermetically sealing the metallic disk to the housing of the compressor comprises welding the larger diameter portion of the metallic disk to the outer surface of the housing.

10. The method of claim 7 wherein said step of installing the terminal pin assembly is performed prior to said step of hermetically sealing.

11. The method of claim 10 wherein said step of installing the terminal pin assembly is performed prior to said step of mounting the metallic disk.

12. The method of claim 7 wherein said step of installing the terminal pin assembly is performed after said step of mounting the metallic disk.

13. The method of claim 12 wherein said step of installing the terminal pin assembly is performed after said step of hermetically sealing.

14. The terminal assembly of claim 1 wherein said second diameter portion further comprises a substantially concave inner surface mating with a substantially convex outer surface of the housing.

15. The terminal assembly of claim 4 wherein said second diameter portion further comprises an at least partially curved surface contoured to conform with an at least partially curved surface of the housing.

16. The method of claim 6 wherein said mounting step further includes mating a substantially concave inner surface of the second diameter portion with a substantially convex outer surface of the housing.

17. The terminal assembly of claim 1 wherein said substantially disk shaped body further comprises a third diameter portion smaller than said second diameter portion and extending outwardly from said second diameter portion.

18. The terminal assembly of claim 4 wherein said substantially disk shaped body further comprises a third diameter portion having a diameter less than the diameter of the second diameter portion, said third diameter portion disposed adjacent said second diameter portion.

19. The method of claim 6 wherein said metallic disk further includes a third diameter portion having a diameter smaller than said second diameter portion and extending outwardly from said second diameter portion.

* * * * *

UNITED STATES PATENT AND TRADEMARK OFFICE
CERTIFICATE OF CORRECTION

PATENT NO. : 7,108,489 B2
APPLICATION NO. : 10/414332
DATED : September 19, 2006
INVENTOR(S) : Zer Kai Yap It is certified that error appears in the above-identified patent and that said Letters Patent is hereby corrected as shown below:

Column 9, Line 12, delete "PLurality" and insert --plurality--

Column 9, Line 52, delete "substantiall" and insert --substantially--

Column 9, Line 53, delete "therealon" and insert --therealong--

Signed and Sealed this

Twelfth Day of December, 2006

JON W. DUDAS
*Director of the United States Patent and Trademark Office*